Jan. 27, 1948.　　M. F. SKINKER ET AL　　2,434,967
RECTIFIER AND METHOD OF MAKING THE SAME
Filed Oct. 26, 1943　　3 Sheets-Sheet 1
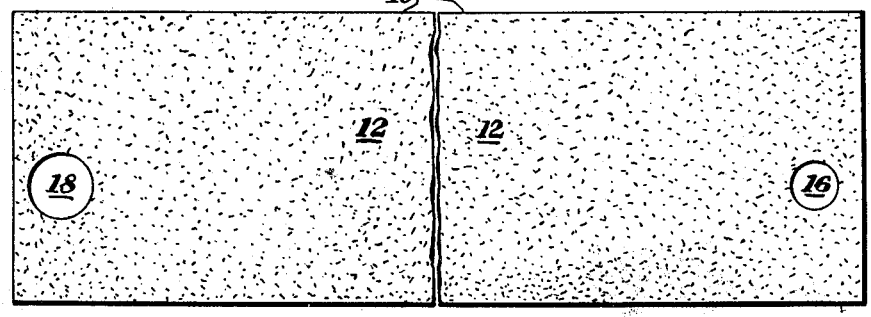
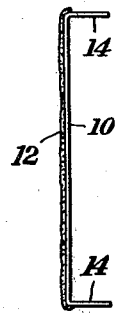
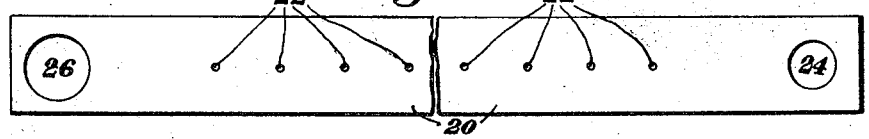
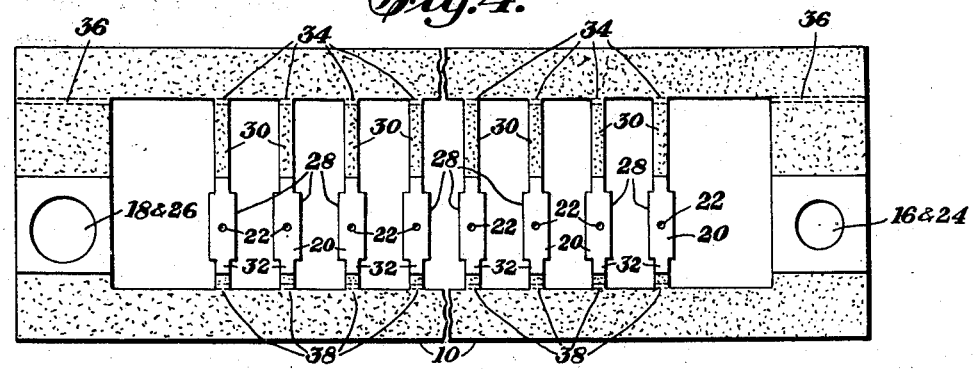
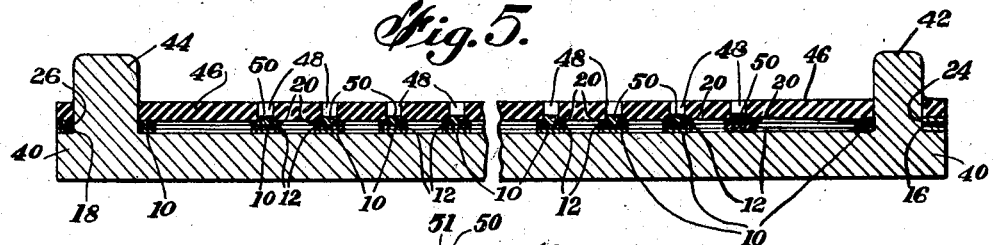
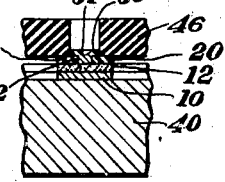
INVENTORS
MURRAY F. SKINKER
IVANHOE P. DENYSSEN
MAX. G. KOLMES
BY
ATTORNEY Jan. 27, 1948. M. F. SKINKER ET AL 2,434,967
RECTIFIER AND METHOD OF MAKING THE SAME
Filed Oct. 26, 1943 3 Sheets-Sheet 2

INVENTORS
MURRAY F. SKINKER
IVANHOE P. DENYSSEN
BY MAX G. HOLMES

ATTORNEY

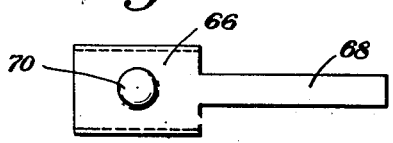
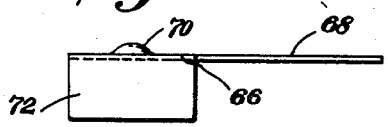
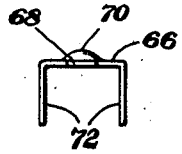
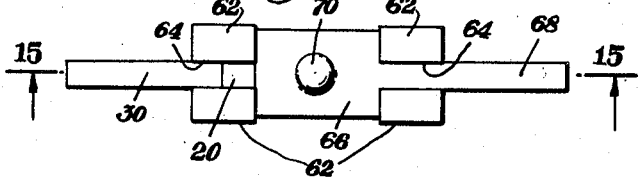
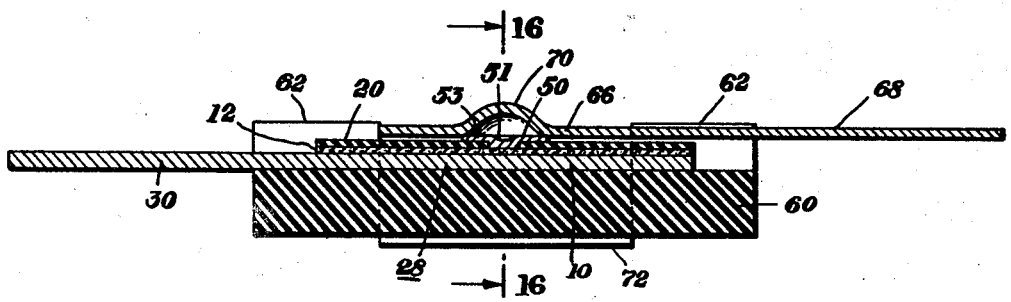
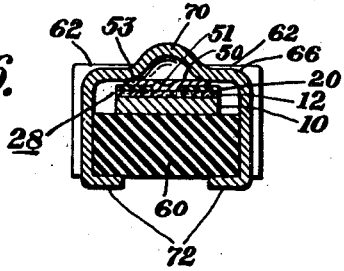
INVENTORS
MURRAY F. SKINKER
IVANHOE P. DENYSSEN
MAX G. KOLMES Patented Jan. 27, 1948

2,434,967

UNITED STATES PATENT OFFICE 2,434,967

RECTIFIER AND METHOD OF MAKING THE SAME

Murray F. Skinker, Montclair, N. J., Ivanhoe P. Denyssen, Lansdowne, Pa., and Max G. Kolmes, Brooklyn, N. Y., assignors to Federal Telephone and Radio Corporation, New York, N. Y., a corporation of Delaware Application October 26, 1943, Serial No. 507,671

19 Claims. (Cl. 175—366)

This invention relates to improvements in rectifiers and methods of making the same, and more particularly to small selenium rectifiers and a preferred method of making the same on a quantity basis.

An object of this invention is to provide a novel selenium rectifier of sturdy and simplified construction.

Another object of this invention is to construct a small selenium rectifier from a minimum of correlated preformed parts.

A further object of this invention is to produce a small compact selenium rectifier unit all of whose parts and whose methods of assembly lend themselves to the cheap production of such rectifiers in large quantities.

Still another object of this invention is directed to a novel method of making small selenium rectifiers in mass production.

Other objects will appear from the following description of an illustrated embodiment of the invention taken together with the attached drawings wherein:

Fig. 1 is a top plan view of a selenium-coated base electrode strip;

Fig. 2 is an end view of the base strip shown in Fig. 1;

Fig. 3 is a top plan view of an insulating gummed paper strip;

Fig. 4 is a top plan view of the base electrode strip of Fig. 1 with the gummed paper strip applied and blanked out to form a plurality of individual rectifier bases.

Fig. 5 is a longitudinal cross-sectional view of the blanked-out strip of Fig. 4 placed in a fixture, with the addition of a spray mask, and showing the counter-electrode alloy sprayed therethrough;

Fig. 6 is an enlarged partial section of one of the rectifier units of Fig. 5;

Fig. 11 is a top plan view of a metal clamp to be used with each rectifier unit;

Fig. 12 is a side view of the same clamp;

Fig. 13 is an end view of the same clamp;

Fig. 14 is a top plan view of a completely assembled rectifier unit;

Fig. 15 is a longitudinal cross-sectional view on a greatly enlarged scale taken along the line 15—15 of Fig. 14;

Fig. 16 is a transverse cross-sectional view taken along the line 16—16 of Fig. 15.

Figure 7:
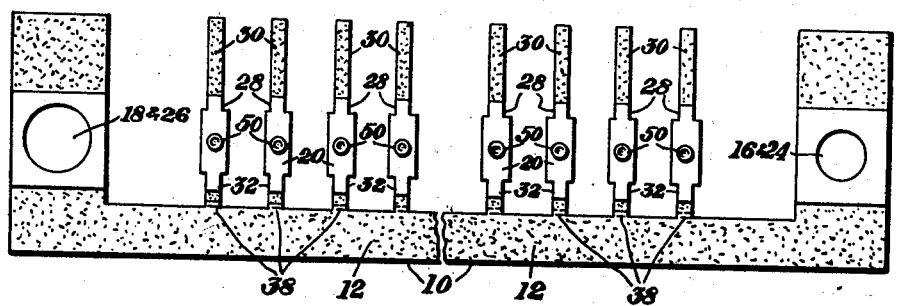
Fig. 7 is a top plan view showing the individual rectifier units with the counter-electrode alloy applied and the spray mask removed, and one side of the metal base stripped off.

It is believed that the construction of the individual rectifier units according to our invention, as well as the actual method of producing these units, can best be described by following through a preferred method of producing the same in large quantities. As will be seen in Figs. 1 and 2, we may start with a substantially rectangular metal base strip which may be first degreased, etched and nickel plated in a known manner and then covered with a selenium coating 12. This selenium coating may be applied in any wellknown manner as by setting the base strip 10 up in a jig (not shown), sprinkling the plate with selenium powder with or without a mask, pressing the selenium and then passing the strip through a heat-treating oven and fuming. These steps are well-known to the art and are not, in themselves, to be considered as part of the present invention. Preferably, the metal base strip 10 is formed with a pair of short depending legs 14 for setting the same up in the jig and also with a pair of locating holes 16 and 18.

After the selenium has been applied as in the manner described above, an insulating strip, preferably in the form of gummed paper 20, provided with a plurality of longitudinally spaced small holes 22 and with locating holes 24 and 26 similar to those in the base-electrode strip 10, is placed over the latter and cemented thereto. While the insulating strip 20 may be made to adhere to the base-electrode strip 10 in any suitable manner, we may use a paper strip which is formed with a rubber adhesive which softens upon heating. This will firmly bond the insulating strip to the base-electrode strip, and more particularly over the selenium coating on the latter.

After the insulating strip 20 has been applied to the base-electrode strip 10, the latter is placed in a suitable punch press or other machine which will blank out the base strip into the shape illustrated in Fig. 4. The blanking operation results in a plurality of longitudinally spaced substantially rectangular units 28 which later form bases for individual rectifiers. These individual units are interconnected with the sides of the original base-electrode strip by relatively narrow bridges 30 and 32. At this time, also, the ends of the bridges 30 may be slightly notched, as indicated at 34 to assist in breaking the units away from the side strips, and additional notches 36 may be formed to assist in removing the whole side of the metal base strip from the remaining portion thereof. Likewise, notches 38 may be formed at the junction between the leads or bridges 32 and the other side of the metal base strip, for the same purpose. It will be noted that when the individual rectifier units are blanked out in the manner described above, the small holes 22 in the insulating paper strip 20 are so spaced as to fall substantially in the center of each one of the units 28.

The blanked-out base is then placed in a jig or fixture 40, shown in Fig. 5. This fixture is provided with a pair of locating pins or extensions 42 and 44 which pass through the locating holes in the base strip to hold the same in proper position on the fixture. A mask 46 is then placed over the assembled base strip. This mask is provided with a plurality of spaced openings 48, each of these openings being coaxial with and slightly larger than the holes 22 centrally positioned on the individual units 28. Counter-electrode alloy material is then sprayed or otherwise applied through each of the holes 48 to form a small counter-electrode alloy mask 50 on each rectifier unit. As is more clearly shown in enlarged Fig. 6 the counter-electrode alloy 50 penetrates through the holes 22 in the paper mask to contact the selenium layer 12 on the metal base 10. If this counter-electrode alloy is thinly applied it will have a cup-shaped central portion 51 just above each hole 22, with a relatively thin circular flange 53 on the paper strip 20 about each of the small holes.

The mask 46 is then removed and, for the purpose of placing the rectifier units in their insulated bases, one side of the metal base strip may be broken off along the notches 34 and 36 so that the strip at this time will have the appearance as shown in the top plan view of Fig. 7.

Figure 8:
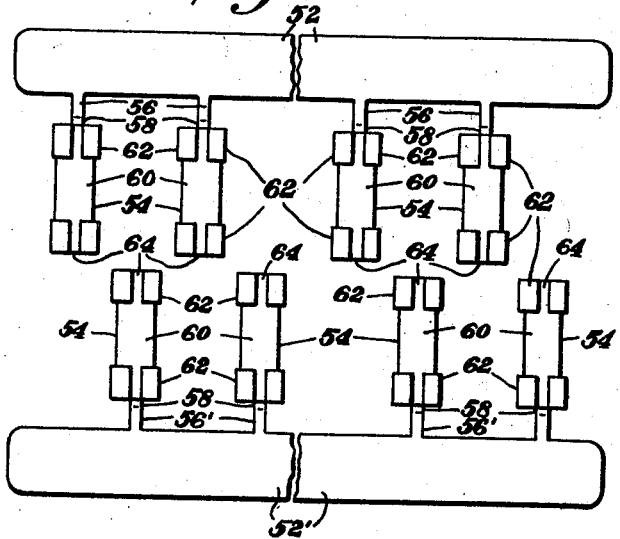
Fig. 8 is a top plan view of a plurality of individual insulating bases for the rectifying units.
Figure 10:
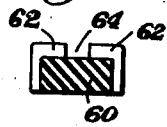
Fig. 10 is a transverse cross-sectional view taken along the line 10—10 of Fig. 9.
Figure 9:
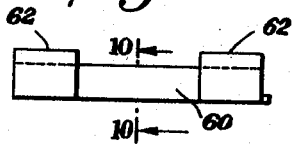
Fig. 9 is a side view of an enlarged scale of one of the insulating bases illustrated in Fig. 8.

The individual insulating bases for the rectifier units may also be made by mass production methods. A sufficient number of insulating bases for all of the rectifier units, formed from one metal base strip, may be moulded together in one piece from any suitable mouldable insulating material. Moulding methods may follow known forms which need not be described here and which form no part of our particular invention. However, after the insulating bases have been moulded the composite moulded piece is preferably separated into two parts 52, 52' as shown in Fig. 8, with certain of the insulating bases 54 remaining attached to the side strip 52, as by bridges 56, while the remaining insulating bases remain attached to the side strip 52' as by the bridges 56'. The individual insulating bases 54 are spaced in the mould with the same longitudinal spacing as is provided for the stamped-out individual rectifier bases 28, but when the moulded structure is separated as indicated in Fig. 8, alternate insulating bases are attached to the individual side strips for reasons which will become apparent shortly.

In accordance with a preferred form of this invention, each individual insulating base 54 consists of a generally rectangular central section 60 with four generally rectangular posts 62, one at each corner. The posts 62 extend a short distance above the central section 60 and also project laterally therefrom a short distance. The posts at each end of the main section 60 are separated by a relatively narrow groove 64.

A comparison of the shape of the individual insulating bases as shown in Fig. 8, with the individual rectifier units 28 as shown in Fig. 7, will show that the central rectangular portion of each one of the rectifier units is of substantially the same length but of somewhat less width than the central section 60 of each of the insulating bases, while the integral extensions 30 and 32 of the individual rectifier units have a width which is no greater than the grooves 64 between the end posts 62 of the insulating bases 54. Thus, the individual rectifier units 28 may be placed into their individual bases which are still attached to the moulding base strip. For example, one of the strips, such as 52, may be placed in juxtaposition with the blanked-out plurality of rectifier units of Fig. 7 in which case, for example, the first, third, fifth, etc., rectifier units may be forced into its corresponding insulating base, broken off from the metal base strip 10 along the notches 38, and the strip 52 with its individual insulating bases 54 and the enclosed rectifier units 28, removed and set to one side. The insulating strip 52' with its attached insulating bases is then placed in juxtaposition with the even rectifier units, the latter pressed into place and broken off and the remaining portion of the base-electrode strip discarded.

In order to firmly secure each rectifier unit to its individual insulating base we prefer to use a clamping device in the form of an inverted U, and illustrated by way of example in Figs. 11, 12 and 13. It will be seen that each one of these clamps 66 is formed with a raised blister 70 on its upper side and with a pair of opposite depending clamping arms or sides 72. Longitudinally from one side of the top there also extends a tongue or a strip 68, preferably formed integrally with the rest of the clamp. One of the insulating strips, such as 52 with its attached insulating bases 54, and the pressed-in rectifier units 28 are then taken and the clamps 66 pressed down so that the top of the clamp 66 is in contact with the counter-electrode alloy on the top of each rectifying unit, while the lower ends of the sides 72 of each clamp may be bent about the bottom of each insulating base. The purpose of separating the moulded base into two widely spaced units is to permit the proper insertion and clamping of the clamp 66. If the mould were not separated in the manner described above the individual rectifier units would be too closely spaced to permit easy attachment of the individual clamps. The close spacing of the individual insulating bases and of the individual rectifier units permits, of course, a maximum utilization of material during the blanking-out and moulding operations. When the clamps are attached to rectifier units attached to one strip 52, other clamps may be then attached to the rectifier units attached to the strip 52'. After the clamps are attached the completed units may be broken off from the moulded side strips, and for this purpose, during the moulding operation notched or weakened sections 58 (Fig. 8) will have been formed between each insulating base 54 and the bridging strip 56.

Each completed rectifier unit will have the appearance shown in Fig. 14, and illustrated further on a much larger scale as shown in Figs. 15 and 16. It will be noted that each metal clamp 66 has a length which is substantially equal to the distance between the pairs of posts 62 on opposite ends of the insulating base 60, while the sides 72 of each clamp are of sufficient length to extend downwardly each side of the rectifier unit and permit a clamping over on the underside of the insulating base. The integral extension 68 is of such a width that it may extend through the groove 64 between the posts 62 on one end of the insulating base, and preferably in a direction opposite to the extension 30. Since the clamp 66 contacts the counter-electrode alloy 50 on the top of the rectifier unit, while the extension 30 is an extension of the metal base 10 of each rectifier unit, the extensions 30 and 68 may thus form a pair of lead terminals for each rectifier unit.

As previously pointed out, each of the metal clamps 66 is preferably formed with a raised hollow blister 70. This blister is so positioned that it will be positioned substantially directly above the depressed portion 51 of the counter-electrode alloy, or in other words, that part of the counter-electrode alloy which is in contact with the selenium. However, the metal clamps 66 still contact the flange section 53 of the counter-electrode alloy. This construction permits a tight clamping action of the clamps 66 about the assembled insulating base and rectifier unit, while still preventing undesired direct pressure upon the small rectifying contact area between the counter-electrode alloy and the selenium. After completion of the assembly of the rectifier units as above described, lead wires may be attached to the lead terminals 30 and 68 and, if desired, additional insulation may be applied to the rectifier unit as a whole, as by covering the same with insulating tape or dipping the whole unit in some moisture-proof lacquer or paint. If a mask was not used when originally applying the selenium to the metal base plate, the selenium on the extension 30 will be removed in any simple manner before attaching wire leads thereto.

While we have described above a preferred form of rectifier unit and a preferred method of making the same, it will be obvious to those skilled in this art that variations in detail in both the construction of the rectifier and the method may be used. Additionally, the device and the method of making the same can be used in connection with rectifying materials other than selenium. It is particularly pointed out that the method of constructing and assembling the rectifier units has been described in a logical sequential order, but that obviously some changes in the sequence of the procedure could be made without changing the basic conception of the method. Insulating material other than gummed paper would be suitable for use in the present invention, and in this case the insulating material could be preformed into shape instead of first attaching it to the metal base strip and blanking out the combination. Instead of applying selenium over the entire metal base strip in the first instance, if desired, a suitable mask could be used and only that portion of the base strip to be blanked out for the individual rectifier units could be covered.

Accordingly, while we have described above the principles of our invention in connection with a specific device and a preferred method of making the same, it is to be clearly understood that this description is made only by way of example and not as a limitation on the scope of our invention as set forth in the objects and the accompanying claims.

We claim:
1. A rectifier comprising, in combination, an insulating base, a metal plate having a narrow extension, mounted on the upper surface of said base, a coating of rectifying material on the upper surface of said metal plate, a layer of insulating material having an opening therethrough covering said rectifying coating, counter-electrode alloy on said insulating layer and extending through said opening to the rectifying layer, and a metal clamp in the general form of an inverted U about said insulating base, metal plate, rectifying coating, insulating layer and counter-electrode alloy, said clamp having the inner side of its top contacting said counter-electrode alloy and its arms gripping the underside of said insulating base, whereby said metal clamp forms one terminal of the rectifier and the extension of said metal plate the other rectifier terminal.

2. The combination according to claim 1, in which said rectifying material is selenium.

3. The combination according to claim 1, in which said clamp is provided with a narrow integral projection extending in a direction opposite to the narrow extension of said base plate, and forming said one terminal.

4. The combination according to claim 1, in which the top of said clamp is formed with a small, hollow, raised blister directly above the opening through the insulating layer to relieve the contact between the counter-electrode alloy and the rectifying layer at that point of clamping pressure.

5. The combination according to claim 1, in which said insulating material is gummed paper.

6. Rectifier comprising, in combination, an insulating base having a substantially plane rectangular central upper surface, with four raised posts at each corner projecting laterally of the insulating base, the posts at opposite ends of the face being separated by a relatively narrow groove, a generally rectangular metal plate on the upper surface of said base, said plate being provided with an integral narrow extension on one end projecting through one groove beyond the insulating base, and a short integral tongue on its other end projecting into its opposite groove, a coating of rectifying material on the upper surface of said metal plate, a layer of insulating material having an opening therethrough covering said rectifying material, counter-electrode alloy on said insulating layer and extending through said opening to the rectifying layer, and a metal clamp about said insulating base, metal plate, rectifying layer, insulating layer, and counter-electrode alloy, in the general form of an inverted U having the inner side of its top lying within the insulating posts on top of and contacting the counter-electrode alloy, and its arms extending downwardly along the sides of said insulating base between the posts and gripping the underside of said insulating base, whereby said metal clamp forms one terminal of the rectifier and the narrow extension of said metal plate the other rectifier terminal.

7. The combination according to claim 6, in which said rectifying material is selenium.

8. The combination according to claim 6, in which the top of said clamp is formed with a small, hollow, raised blister directly above the opening through the insulating layer, to relieve the contact between the counter-electrode alloy and the rectifying layer at that point of clamping pressure.

9. The combination according to claim 6, in which said insulating material is gummed paper.

10. The combination according to claim 6, in which said clamp is provided with an integral projection on its top extending through said opposite grooves outwardly of the base and forming said one terminal.

11. The combination according to claim 6, in which the metal plate is narrower than the width of the face of the insulating base.

12. The method of making rectifiers, which includes the steps of covering one side of a metal base plate with selenium, attaching a relatively narrow strip of gummed paper having a plurality of longitudinally spaced small holes, longitudinally over a portion of the selenium on the base plate, blanking out the metal plate and the attached paper into opposite, longitudinally extending metal borders connected by a plurality of paper-covered transversely extending, similarly longitudinally spaced bridges, each bridge comprising two relatively narrow sections, one connected to each border, integrally joined by a wider substantially rectangular section with the holes in said attached paper positioned substantially in the center of each rectangular section, covering the blanked-out strip with a mask having openings therethrough concentric with and slightly larger than the holes in the paper, applying counter-electrode alloy through the openings of said mask onto the paper and through its holes to the selenium layers on the respective rectangular sections, placing each of the rectangular sections on one side of individual pre-formed insulating bases, and pressing a metal clamp about each assembled section and base with one portion of the clamp contacting the counter-electrode alloy and another portion gripping the underside of the base, and then breaking each bridge from the metal borders.

13. A metal contact rectifier comprising an insulating base, a rectifier element mounted on the base comprising a base electrode, a semi-conducting layer, a counter-electrode and insulation located between the outer portion of the semi-conducting layer and the counter-electrode, and a sheet metal contact member bearing against said outer portion of the counter-electrode, the portion of said contact member which overlies the area of the counter-electrode in contact with the semi-conducting layer being outwardly deflected, the arrangement being such that pressure is exerted by the contact member only on said outer portion of the counter-electrode.

14. A method of manufacturing metal contact rectifiers which comprises forming a plurality of rectifiers mounted in alignment on a common support, assembling the rectifiers with insulating bases and thereafter separating the rectifiers from said support.

15. A method of manufacturing metal contact rectifiers which comprises forming a plurality of insulating bases mounted in alignment on a common support, assembling a rectifier with each base and thereafter separating the base from the support.

16. A method of manufacturing metal contact rectifiers which comprises forming a plurality of rectifiers mounted in alignment on a common support, forming a plurality of insulating bases mounted in alignment on a common support, assembling the rectifiers and bases and thereafter separating the bases and rectifiers from said supports.

17. A metal contact rectifier comprising an insulating base having a recess, a rectifier element fitted in the recess and comprising metal electrodes engaging opposite sides of a semi-conducting layer, and a metal clamp formed with a raised hollow blister and arranged with its sides extending angularly therefrom and about said insulating base and rectifier, said clamp having its inner side around said blister contacting one of said metal electrodes and its sides gripping the underside of said insulating base.

18. The combination according to claim 17, in which the other metal electrode is provided with an integral extension forming one rectifier terminal and said metal clamp is provided with an integral extension forming a second rectifier terminal.

19. A metal contact rectifier comprising an insulating base, a rectifier element mounted on the base comprising a base electrode, a semi-conducting layer, a counter-electrode, and insulation located between the outer portion of the semi-conducting layer and the counter-electrode, and a metal clamp formed with a raised hollow blister, said blister shaped to permit said metal clamp to make contact only with the flange of said counter-electrode, said clamp having sides extending angularly therefrom and about said insulating base and rectifier element, said clamp having the inner side of its top contacting said counter-electrode and its sides gripping the underside of said insulating base.

MURRAY F. SKINKER,
IVANHOE P. DENYSSEN.
MAX G. KOLMES.

REFERENCES CITED

The following references are of record in the file of this patent:

UNITED STATES PATENTS

| Number | Name | Date |
|---|---|---|
| 1,898,321 | Strobel | Feb. 21, 1933 |
| 1,900,732 | Place | Mar. 7, 1933 |
| 1,995,200 | Cubitt et al. | Mar. 19, 1935 |
| 1,678,826 | Ruben | July 31, 1928 |
| 1,526,664 | Dubilier | Feb. 17, 1925 |
| 1,642,688 | Moss | Sept. 20, 1927 |
| 2,314,104 | Richards | Mar. 16, 1943 |